(12) United States Patent
Nielsen et al.

(10) Patent No.: US 7,867,530 B2
(45) Date of Patent: Jan. 11, 2011

(54) COMPOSITION

(75) Inventors: Jens Mogens Nielsen, Galten (DK); Lars Høegh, Mårslet (DK)

(73) Assignee: Danisco A/S, Copenhagen (DK)

( * ) Notice: Subject to any disclaimer, the term of this patent is extended or adjusted under 35 U.S.C. 154(b) by 453 days.

(21) Appl. No.: 10/699,377

(22) Filed: Oct. 31, 2003

(65) Prior Publication Data

US 2004/0146609 A1     Jul. 29, 2004

Related U.S. Application Data

(60) Provisional application No. 60/443,450, filed on Jan. 29, 2003.

(30) Foreign Application Priority Data

Jan. 27, 2003   (GB) ................................. 0301869.4

(51) Int. Cl.
    *A23P 1/08* (2006.01)
(52) U.S. Cl. ...................... 426/89; 426/138; 426/274; 426/302
(58) Field of Classification Search ............ 426/89
    See application file for complete search history.

(56) References Cited

U.S. PATENT DOCUMENTS

| | | | | |
|---|---|---|---|---|
| 2,054,112 A | * | 9/1936 | Abrams et al. ............... | 524/489 |
| 2,109,093 A | * | 2/1938 | Rossman et al. ............... | 426/8 |
| 2,682,475 A | * | 6/1954 | Smith .......................... | 426/125 |
| 2,909,435 A | * | 10/1959 | Waiters et al. .............. | 426/102 |
| 3,000,748 A | | 9/1961 | Clark | |
| 3,192,057 A | | 6/1965 | Hines et al. | |
| 3,293,043 A | * | 12/1966 | Matz et al. .................. | 426/307 |
| 3,388,085 A | | 6/1968 | Levkoff et al. | |
| 3,779,783 A | | 12/1973 | Bunger et al. | |
| T983,004 I4 | * | 6/1979 | Taylor et al. ................. | 428/467 |
| 4,576,616 A | | 3/1986 | Mottram et al. | |
| 4,576,646 A | | 3/1986 | Branco et al. | |
| 4,585,658 A | | 4/1986 | Poppe et al. | |
| 4,661,359 A | * | 4/1987 | Seaborne et al. .............. | 426/89 |
| 4,710,228 A | * | 12/1987 | Seaborne et al. ............ | 106/218 |
| 4,780,326 A | * | 10/1988 | Stemmler et al. ........... | 426/125 |
| 4,810,534 A | * | 3/1989 | Seaborne et al. ............ | 427/384 |
| 4,820,533 A | * | 4/1989 | Seaborne et al. .............. | 426/76 |
| 4,874,618 A | * | 10/1989 | Seaborne et al. .............. | 426/76 |
| 4,915,971 A | * | 4/1990 | Fennema et al. ............. | 426/578 |
| 5,130,150 A | * | 7/1992 | Averbach ...................... | 426/99 |
| 5,130,151 A | * | 7/1992 | Averbach ...................... | 426/99 |
| 5,202,137 A | * | 4/1993 | Duffy et al. ................... | 426/89 |
| 5,248,512 A | | 9/1993 | Berberat et al. | |
| 5,401,518 A | | 3/1995 | Adams et al. | |
| 5,405,626 A | * | 4/1995 | Van Der Graaf et al. ...... | 426/94 |
| 5,516,536 A | * | 5/1996 | Mikkelsen et al. ............ | 426/99 |
| 5,518,744 A | * | 5/1996 | Kaeser et al. ................. | 426/90 |
| 5,662,732 A | * | 9/1997 | Kelley et al. ................ | 106/271 |
| 5,853,778 A | * | 12/1998 | Mayfield ....................... | 426/89 |
| 5,928,692 A | * | 7/1999 | Mayfield ....................... | 426/89 |
| 6,165,521 A | * | 12/2000 | Mayfield ....................... | 426/90 |
| 6,461,654 B1 | * | 10/2002 | Cain et al. ..................... | 426/94 |
| 6,472,006 B1 | * | 10/2002 | Loh et al. ...................... | 426/99 |
| 7,226,630 B2 | * | 6/2007 | Loh et al. .................... | 426/302 |
| 7,229,654 B2 | * | 6/2007 | Gaonkar et al. ............... | 426/89 |

FOREIGN PATENT DOCUMENTS

| | | | |
|---|---|---|---|
| EP | 0 403 030 | | 6/1990 |
| EP | 0 679 337 | | 4/1995 |
| EP | 1 051 903 | | 11/2000 |
| GB | 574681 | | 1/1946 |
| GB | 808634 | | 2/1959 |
| GB | 989928 | | 4/1965 |
| JP | 3-22942 | | 1/1991 |
| JP | 4-229146 | | 8/1992 |
| WO | WO 01/14466 | | 3/2001 |
| WO | WO 03/068001 | * | 8/2003 |
| WO | WO 2005/029975 | | 4/2005 |
| WO | WO 2006/002734 | | 1/2006 |

OTHER PUBLICATIONS

Conca, K. et al., "Edible Food Barrier Coatings," *Activities Report*, 45(1): 41-53, 1993.
Greener, I. et al., "Lipid-Based Edible Films and Coatings," *Lipid Technology*, 34-38, 1992.
Guilbert, S., "Technology and Application of Edible Protective Films." In: Food Packaging and Preservation, Theory and Practice (Mathlouthi, ed.), Elsevier Applied Science Publishers, New York, p. 371-94, 1986.
Kester, J. et al., "Edible Films and Coatings: a Review," *Food Technology*, 40(12): 47-59, 1986.

(Continued)

*Primary Examiner*—Carolyn A Paden
(74) *Attorney, Agent, or Firm*—Frommer Lawrence & Haug LLP; Thomas J. Kowalski; Heather J. DiPietrantonio

(57) ABSTRACT

There is provided a composition comprising i) a wax in an amount of 10 to 40 wt. % based on the composition ii) a compound in an amount of 60 to 90 wt. % based on the composition, having the formula $$R_1 \left[ O - \underset{H_2}{C} - \overset{H}{\underset{|}{C}} - \overset{H}{\underset{|}{C}} - H \right]_t$$
$$\phantom{R_1 \left[ O - \underset{H_2}{C} - \right.} \overset{|}{\underset{R_2}{O}} \phantom{-} \overset{|}{\underset{R_3}{O}}$$

wherein t is an integer, wherein each $R_1$, $R_2$ and $R_3$ is independently selected from an acyl group or a hydrogen atom, wherein at least one of $R_1$, $R_2$ and $R_3$ is H or an acyl group (a short acyl group) having from 2 to 6 carbon atoms, wherein at least one of $R_1$, $R_2$ and $R_3$ is an optionally branched chain acyl group (a long acyl group) consisting of a saturated chain having 10 to 20 carbon atoms and an optional hydrophilic branch group.

47 Claims, 2 Drawing Sheets

OTHER PUBLICATIONS

Kester, J. et al., "The Influence of Polymorphic Form on Oxygen and Water Vapor Transmission Though Lipid Forms," *JAOCS*, 66(8): 1147-53, 1989.

Morillon, V. et al, "Factors Affecting the Moisture Permeability of Lipid-Based Edible Films: a Review," *Critical Reviews in Food Science and Nutrition*, 42(1): 67-89, 2002.

Taoukis, P. et al., "Moisture Transfer and Shelf Life of Packaged Foods." In: Food and Packaging Interactions, American Chemical Society, p. 243-59, 1988.

Callegarin, et al.; "Lipids and Biopackaging"; JAOCS (1997); vol. 74:10; pp. 1183-1192.

* cited by examiner

COMPOSITION

REFERENCE TO RELATED APPLICATIONS

This application claims priority to United Kingdom Application 0301869.4 filed Jan. 27, 2003, U.S. Provisional Application 60/443,450 filed Jan. 29, 2003, and to International Patent Application PCT/IB00/02500 filed May 2, 2003.

Each of the foregoing applications, and each document cited or referenced in each of the foregoing applications, including during the prosecution of each of the foregoing applications and ("application cited documents"), and any manufacturer's instructions or catalogues for any products cited or mentioned in each of the foregoing applications and articles and in any of the application cited documents, are hereby incorporated herein by reference. Furthermore, all documents cited in this text, and all documents cited or referenced in documents cited in this text, and any manufacturer's instructions or catalogues for any products cited or mentioned in this text or in any document hereby incorporated into this text, are hereby incorporated herein by reference. Documents incorporated by reference into this text or any teachings therein may be used in the practice of this invention. Documents incorporated by reference into this text are not admitted to be prior art.

It is noted that in this disclosure and particularly in the claims, terms such as "comprises", "comprised", "comprising" and the like can have the meaning attributed to it in U.S. patent law; e.g., they can mean "includes", "included", "including", and the like; and that terms such as "consisting essentially of" and "consists essentially of" have the meaning ascribed to them in U.S. patent law, e.g., they allow for elements not explicitly recited, but exclude elements that are found in the prior art or that affect a basic or novel characteristic of the invention.

SUMMARY OF THE INVENTION

The present invention relates to a compound. In particular, the present invention relates to a composition which may act as a barrier against water and moisture particularly when used to coat foodstuffs.

BACKGROUND

As discussed in U.S. Pat. No. 6,472,006 for many food products, moisture levels must be maintained if the product is to exhibit optimum organoleptic properties, quality, and taste. Moisture migration in finished food products can seriously compromise quality, stability, and organoleptic properties. In addition, many chemical and enzymatic deteriorative reactions proceed at rates partially governed by the moisture content of foods. Excessive rates of these reactions can promote deleterious changes in the flavour, colour, texture, and nutritive value of food products.

In multi-component food products, particularly those having components with different moisture contents and water activities (e.g., pre-packaged cheese and crackers or pre-packaged bagel and cheese cream products), moisture can migrate between adjacent components, altering the component's characteristics and organoleptic properties. In addition to compromising the quality of finished food products, moisture migration can hinder production and distribution of food products. Thus, for example, the cheese in a cheese/cracker product could dry out while, at the same time, the cracker losses its crispness.

One method to prevent moisture migration in foods involves coating one or more surfaces of the food product with an edible moisture barrier. Such barriers should have a low moisture permeability in order to prevent the migration of water between areas of differing water activities. In addition, the barrier should cover the food surface completely, including crevices, and adhere well to the food product surface. The moisture barrier should be sufficiently strong, soft, and flexible to form a continuous surface that will not crack upon handling, yet can be easily penetrated during consumption. In addition, the barrier film's organoleptic properties of taste, aftertaste, and mouthfeel should be imperceptible so that the consumer is not aware of the barrier when the food product is consumed. Finally, the moisture barrier should be easy to manufacture and easy to use.

Because lipids, such as, for example, oils, fats, and waxes, are composed of lipophilic or water insoluble molecules capable of forming a water impervious structure, they have been investigated for use in moisture barrier films. With respect to oleaginous materials (i.e., fats, oils, sucrose polyesters, and the like) and/or other film forming lipids, it has been taught that, unless an undesirably thick coating is used, the barrier is not effective. Wax barriers have disadvantages as moisture barriers because they tend to crack upon handling or with changes in temperatures. Mixture of waxes with other components have been taught in the art, for example by Greener et al., 34-38, Lipid Technology, March-April 1992. However, these previously disclosed mixture also have suffered from the fragility problems of pure waxes such as beeswax.

The present invention alleviates problems of the prior art.

DETAILED DESCRIPTION

Figure 1:
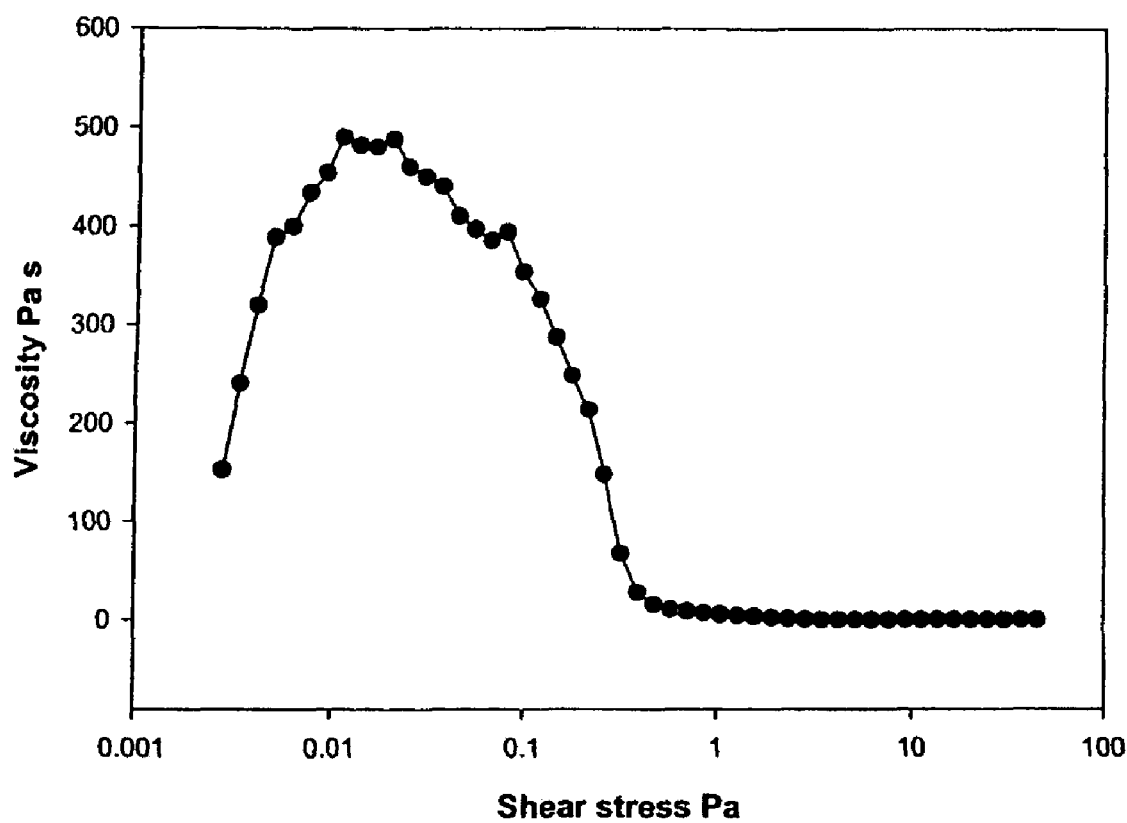
FIG. 1 shows a yield stress curve.

Aspects of the invention are defined in the numbered paragraphs and in the appended claims.

In one aspect the present invention provides a composition comprising i) a wax in an amount of 10 to 40 wt. % based on the composition, ii) a compound in an amount of 60 to 90 wt. % based on the composition, having the formula

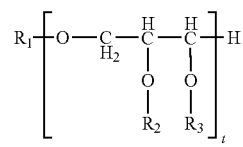

wherein t is an integer, wherein each $R_1$, $R_2$ and $R_3$ is independently selected from an acyl group or a hydrogen atom, wherein at least one of $R_1$, $R_2$ and $R_3$ is H or an acyl group (a short acyl group) having from 2 to 6 carbon atoms, wherein at least one of $R_1$, $R_2$ and $R_3$ is an optionally branched chain acyl group (a long acyl group) consisting of a saturated chain having 10 to 20 carbon atoms and an optional hydrophilic branch group.

In one aspect the present invention provides a coated foodstuff comprising (a) a foodstuff substrate, (b) a coating comprising a composition as defined herein.

In one aspect the present invention provides a process for preparing a coated foodstuff, comprising coating a foodstuff with a composition as defined herein.

In one aspect the present invention provides a process for preparing a coating composition, the process comprising the step of contacting i) a wax in an amount of 2 to 50 wt. % based on the composition; and ii) a compound in an amount of 50 to 98 wt. % based on the composition, having the formula

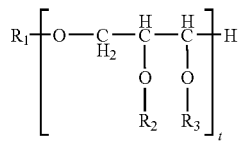

wherein t is an integer, wherein each $R_1$, $R_2$ and $R_3$ is independently selected from an acyl group or a hydrogen atom, wherein at least one of $R_1$, $R_2$ and $R_3$ is H or an acyl group (a short acyl group) having from 2 to 6 carbon atoms, wherein at least one of $R_1$, $R_2$ and $R_3$ is an optionally branched chain acyl group (a long acyl group) consisting of a saturated chain having 10 to 20 carbon atoms and an optional hydrophilic branch group.

In one aspect the present invention provides a kit comprising i) a wax; and ii) a compound having the formula

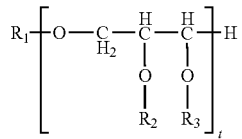

wherein t is an integer, wherein each $R_1$, $R_2$ and $R_3$ is independently selected from an acyl group or a hydrogen atom, wherein at least one of $R_1$, $R_2$ and $R_3$ is H or an acyl group (a short acyl group) having from 2 to 6 carbon atoms, wherein at least one of $R_1$, $R_2$ and $R_3$ is an optionally branched chain acyl group (a long acyl group) consisting of a saturated chain having 10 to 20 carbon atoms and an optional hydrophilic branch group; wherein the kit is formulated to provide the wax in an amount of 2 to 50 wt. % based on the composition, and the compound in an amount of 50 to 98 wt. % based on the composition.

In one aspect the present invention provides use of a composition for preventing and/or reducing migration of water into or out of a material, wherein the composition comprises i) a wax in an amount of 2 to 50 wt. % based on the composition; and ii) a compound in an amount of 50 to 98 wt. % based on the composition, having the formula

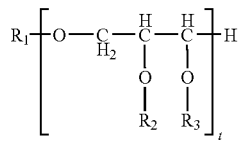

wherein t is an integer, wherein each $R_1$, $R_2$ and $R_3$ is independently selected from an acyl group or a hydrogen atom, wherein at least one of $R_1$, $R_2$ and $R_3$ is H or an acyl group (a short acyl group) having from 2 to 6 carbon atoms, wherein at least one of $R_1$, $R_2$ and $R_3$ is an optionally branched chain acyl group (a long acyl group) consisting of a saturated chain having 10 to 20 carbon atoms and an optional hydrophilic branch group.

We have found that by mixing a wax in an amount of 10 to 40 wt. % with a compound described above, for example GRINDSTED$^{RTM}$ ACETEM Acetic Acid Ester available from Danisco A/S, Brabrand, Denmark, excellent moisture barrier properies may be observed. It is believed that the above compound acts as a plasticiser when mixed with a wax. Wax is extremely effective in preventing water migration if the wax film or coating is uniform and unbroken. However waxes are typically very brittle and easily form cracks and pinholes, which result in loss of barrier properties. We have found that addition of up to 90% of the above defined compound improves the texture of a wax dramatically without altering its excellent resistance to water migration.

As will be described below in the examples section measurement of the permeability coefficient (P-value) shows that a pure wax such as beeswax has a P-value less than 14 at 5° C. and pure GRINDSTED$^{RTM}$ ACETEM Acetic Acid Ester approximately 750. A mixture of 80% GRINDSTED$^{RTM}$ ACETEM Acetic Acid Ester and 20% beeswax has a P-value of 27 (unit=mg μm/m$^2$ mmHg min).

Preferred Aspects

Wax

In one preferred aspect the wax is selected from beeswax, candelilla wax, carnauba wax, jojoba wax, whale wax, paraffin wax, mineral wax, and microcrystalline wax.

In one highly preferred aspect the wax is beeswax.

The wax may be deodorised and/or refined.

Compound

In one preferred aspect t is from 1 to 10.
In one preferred aspect t is from 1 to 5
In one preferred aspect t is 1 or 2.
In one preferred aspect the compound is of the formula

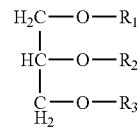

In one preferred aspect at least one of $R_1$, $R_2$ and $R_3$ is an acyl group (a short acyl group) having from 2 to 6 carbon atoms.

Preferably two of $R_1$, $R_2$ and $R_3$ are short acyl groups as described above and the other of $R_1$, $R_2$ and $R_3$ is a long acyl group as described above. In this aspect, the compound may be of the formula

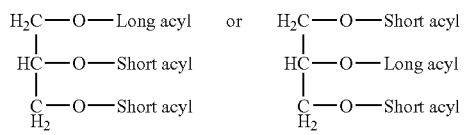

In one preferred aspect at least one of $R_1$, $R_2$ and $R_3$ is H, and at least one of $R_1$, $R_2$ and $R_3$ is an acyl group (a long acyl group) consisting of a saturated chain having 10 to 20 carbon atoms.

In a preferred aspect of the present invention the chain of the long acyl group consists of a chain having 14 to 20 carbon atoms, preferably the chain of the long acyl group consists of a chain having 16 to 20 carbon atoms.

In a preferred aspect of the present invention the chain of the long acyl group consists of a saturated chain having 14 to 20 carbon atoms. In a more preferred aspect, the chain of the long acyl group consists of a saturated chain having 16 to 20 carbon atoms.

In a preferred aspect of the present invention the short acyl group is an acyl group having from 2 to 5 carbon atoms. In a more preferred aspect, the short acyl group is an acyl group having 2 carbon atoms. The short acyl group is preferably of the formula

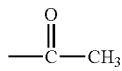

In certain aspects, it is desirable for the short acyl groups to be present in a maximum amount with respect to the total amount of glycerol and esters thereof present in the composition. Preferably the short acyl group is present in an amount, on average, of no greater than 2 moles per mole of glycerol and esters thereof present in the composition.

In certain aspects, it is desirable for the long acyl groups to be present in a minimum amount with respect to the total amount glycerol and esters thereof present in the composition. Preferably the long acyl group is present in an amount, on average, of at least 0.4 moles, preferably from 0.9 to 2 moles, more preferably from 0.9 to 1 moles per mole of glycerol and esters thereof present in the composition.

It may also be preferred for the majority of the glycerol present in the composition to be fully acylated. Accordingly, in a preferred aspect the total amount of acyl groups is, on average, 0.8 to 3.0 moles per mole of glycerol and esters thereof Unbranched In a preferred aspect of the present invention at least one of $R_1$, $R_2$ and $R_3$ is an unbranched acyl group.

In a preferred aspect of the present invention at least one of $R_1$, $R_2$ and $R_3$ is an unbranched chain acyl group (a long acyl group) consisting of a saturated chain having 10 to 20 carbon atoms.

In a preferred aspect of the present invention the or each long acyl group is unbranched.

In a preferred aspect of the present invention each $R_1$, $R_2$ and $R_3$ is independently selected from an acyl group or a hydrogen atom, wherein at least one of $R_1$, $R_2$ and $R_3$ is H or an acyl group (a short acyl group) having from 2 to 6 carbon atoms, wherein at least one of $R_1$, $R_2$ and $R_3$ is an unbranched acyl group (a long acyl group) consisting of a saturated chain having 10 to 20 carbon atoms.

Branched

In one aspect of the present invention at least one of $R_1$, $R_2$ and $R_3$ is a branched chain acyl group (a long acyl group).

In one aspect of the present invention at least one of $R_1$, $R_2$ and $R_3$ is a branched chain acyl group (a long acyl group) consisting of a saturated chain having 10 to 20 carbon atoms and a hydrophilic branch group.

In one aspect of the present invention at least one of $R_1$, $R_2$ and $R_3$ is a branched chain acyl group (a long acyl group) consisting of a saturated chain having 10 to 20 carbon atoms and a hydrophilic branch group.

In one aspect each $R_1$, $R_2$ and $R_3$ is independently selected from an acyl group or a hydrogen atom, wherein at least one of $R_1$, $R_2$ and $R_3$ is an acyl group (a short acyl group) having from 2 to 6 carbon atoms, wherein at least one of $R_1$, $R_2$ and $R_3$ is an optionally branched chain acyl group (a long acyl group) consisting of a saturated chain having 10 to 20 carbon atoms and an optional hydrophilic branch group.

WO 01/14466 teaches a thermoplastic polymer composition containing a compound having the formula

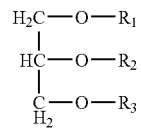

wherein $R_1$, $R_2$ and $R_3$ are independently selected from an acyl group or a hydrogen atom, wherein at least one of $R_1$, $R_2$ and $R_3$ is an acyl group (a short acyl group) having from 2 to 6 carbon atoms, wherein at least one of $R_1$, $R_2$ and $R_3$ is a branched chain acyl group (a long acyl group) consisting of a saturated chain having 10 to 20 carbon atoms and a hydrophilic branch group. The compound of the present invention may be as described in WO 01/14466 or may be prepared in accordance with the teaching of WO 01/14466.

The hydrophilic branch group may be a group selected from acyl and derivatives thereof. Preferred derivatives include groups of the formula —O-acyl.

The hydrophilic branch group may be a group of the formula

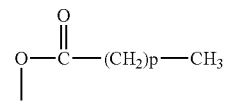

wherein p is from 0 to 4 or 0 to 3.

The long acyl group may be of the formula

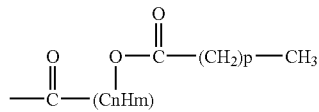

wherein n is from 10 to 20 and m is 2n, and wherein p is from 0 to 4 or 0 to 3.

In one aspect n is from 16 to 20, from 16 to 18, or 17.

The group CnHm may be a straight chain hydrocarbon group.

In a one aspect the long acyl group is a group of the formula

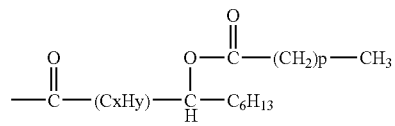

wherein x is from 7 to 10, for example x is 10, and y is 2x, and wherein p is from 0 to 4 or 0 to 3, for example p is 0.

The group CxHy may be a straight chain hydrocarbon group.

The long acyl group may be a group of the formula

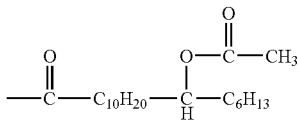

The short acyl group and the hydrophilic branch group may contain the same number of carbon atoms. The hydrophilic branch group may be a group of the formula

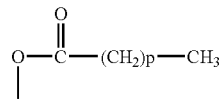

and the short acyl group may be of the formula

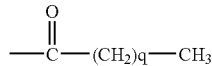

wherein p=q and is from 0 to 4 or 0 to 3.

Process

The compound of the present invention may be prepared by interesterification between glycerol and one or more oils, including natural oils and hardened natural oils followed by acylation. Thus, the compound of the present invention may be the product of a two part process comprising (i) an interesterification between glycerol and an oil selected from castor oil, including hardened castor oil, unhardened castor oil and mixtures thereof, and (ii) acylation.

Typical oil feedstocks for a process outlined above include fully hydrogenated, partly hydrogenated and non-hydrogenated fats and oils including palm oil, soy oil, rape seed oil, high erusic rape seed oil, sunflower oil, safflower oil, corn oil, cottonseed oil, lard, tallow, palm kernel oil, coconut oil, peanut oil, castor oil and fractions thereof.

The compound of the present invention may be prepared from one or more relevant fatty acids rather than from an oil or fat containing one or more fatty acids. Suitable fatty acids for use in the preparation of the compound include lauric acid, palmitic acid, stearic acid, oleic acid, linoleic acid, linolenic acid, behenic acid, erucic acid, elaidic acid, and hydroxy acids such as 12 hydroxy oleic acid and 12 hydroxy stearic acid.

The process of the present invention may utilise, for example, castor oil or hardened castor oil. The compound of the present invention may be prepared from hardened castor oil. A typical fatty acid profile of castor oil and hardened castor oil is given below.

| Fatty Acid | Content [%] |
|---|---|
| Castor Oil | |
| Palmitic (C16) | 1.0 |
| Stearic (C18) | 1.1 |
| Oleic (C18:1) | 3.8 |
| Linoleic (C18:2) | 4.4 |

| Fatty Acid | Content [%] |
|---|---|
| Linolenic (C18:3) | 0.5 |
| Gadoleic (C20:1) | 0.5 |
| Ricinoleic (C18:1-OH) | 87.4 |
| Hardened Castor Oil | |
| Palmitic (C16) | 1.3 |
| Stearic (C18) | 9.3 |
| Oleic (C18:1) | 0.9 |
| Linoleic (C18:2) | 0.2 |
| Arachidic (C20) | 0.7 |
| Ricinoleic. hard (C18-OH) | 84.9 |

The nomenclature in parenthesis is Cxx:y where xx is the fatty acid carbon number and y indicates number of double bonds. Ricinoleic acid, hard (also known as 12-hydroxy stearic acid) has a hydroxyl group (OH) on the $12^{th}$ carbon.

Particularly preferred compounds of the present invention are set out below with reference to the following formula

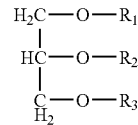

Compounds 1 to 42 are based on distilled monoglycerides. Particularly preferred are compounds 1 to 12. Compounds 43 to 70 are based on diglycerides. For each of the compounds below the chain may be saturated, cis-unsaturated or trans-unsaturated. It is particularly preferred that the chains are saturated.

| | Chain Length (including C=O group) | | |
|---|---|---|---|
| Compound | R1 | R2 | R3 |
| 1 | 18 | 2 | 2 |
| 2 | 18 | H | 2 |
| 3 | 18 | 2 | H |
| 4 | 2 | 18 | 2 |
| 5 | H | 18 | 2 |
| 6 | 2 | 18 | H |
| 7 | 16 | 2 | 2 |
| 8 | 16 | H | 2 |
| 9 | 16 | 2 | H |
| 10 | 2 | 16 | 2 |
| 11 | H | 16 | 2 |
| 12 | 2 | 16 | H |
| 13 | 14 | 2 | 2 |
| 14 | 14 | H | 2 |
| 15 | 14 | 2 | H |
| 16 | 2 | 14 | 2 |
| 17 | H | 14 | 2 |
| 18 | 2 | 14 | H |
| 19 | 12 | 2 | 2 |
| 20 | 12 | H | 2 |
| 21 | 12 | 2 | H |
| 22 | 2 | 12 | 2 |
| 23 | H | 12 | 2 |
| 24 | 2 | 12 | H |
| 25 | 10 | 2 | 2 |
| 26 | 10 | H | 2 |
| 27 | 10 | 2 | H |
| 28 | 2 | 10 | 2 |
| 29 | H | 10 | 2 |
| 30 | 2 | 10 | H |
| 31 | 8 | 2 | 2 |

-continued

| Compound | Chain Length (including C=O group) | | |
|---|---|---|---|
| | R1 | R2 | R3 |
| 32 | 8 | H | 2 |
| 33 | 8 | 2 | H |
| 34 | 2 | 8 | 2 |
| 35 | H | 8 | 2 |
| 36 | 2 | 8 | H |
| 37 | 22 | 2 | 2 |
| 38 | 22 | H | 2 |
| 39 | 22 | 2 | H |
| 40 | 2 | 22 | 2 |
| 41 | H | 22 | 2 |
| 42 | 2 | 22 | H |
| 43 | 18 | 18 | 2 |
| 44 | 18 | 18 | H |
| 45 | 18 | 2 | 18 |
| 46 | 18 | H | 18 |
| 47 | 16 | 16 | 2 |
| 48 | 16 | 16 | H |
| 49 | 16 | 2 | 16 |
| 50 | 16 | H | 16 |
| 51 | 14 | 14 | 2 |
| 52 | 14 | 14 | H |
| 53 | 14 | 2 | 14 |
| 54 | 14 | H | 14 |
| 55 | 12 | 12 | 2 |
| 56 | 12 | 12 | H |
| 57 | 12 | 2 | 12 |
| 58 | 12 | H | 12 |
| 59 | 10 | 10 | 2 |
| 60 | 10 | 10 | H |
| 61 | 10 | 2 | 10 |
| 62 | 10 | H | 10 |
| 63 | 8 | 8 | 2 |
| 64 | 8 | 8 | H |
| 65 | 8 | 2 | 8 |
| 66 | 8 | H | 8 |
| 67 | 22 | 22 | 2 |
| 68 | 22 | 22 | H |
| 69 | 22 | 2 | 22 |
| 70 | 22 | H | 22 |

Composition

In a preferred aspect of the present invention the wax is present in an amount of 2 to 40 wt. % based on the composition, preferably in an amount of 5 to 40 wt. % based on the composition, preferably in an amount of 10 to 40 wt. % based on the composition, preferably in an amount of 10 to 30 wt. % based on the composition, preferably in an amount of 15 to 25 wt. % based on the composition, more preferably in an amount of approximately 20 wt. % based on the composition.

In one preferred aspect of the present invention the wax is present in an amount of 5 to 50 wt. % based on the composition, preferably in an amount of 10 to 50 wt. % based on the composition.

In a preferred aspect of the present invention the compound as defined herein is present in an amount of 60 to 98 wt. % based on the composition, preferably in an amount of 60 to 95 wt. % based on the composition, preferably in an amount of 60 to 90 wt. % based on the composition, preferably in an amount of 70 to 90 wt. % based on the composition, preferably in an amount of 75 to 85 wt. % based on the composition, more preferably in an amount of approximately 80 wt. % based on the composition.

In one preferred aspect of the present invention the compound is present in an amount of 50 to 95 wt. % based on the composition, preferably in an amount of 50 to 90 wt. % based on the composition.

The composition of the present invention may comprise one or more components in addition to the wax and compound described herein. These additional components are typically referred to as auxiliary materials. In a preferred aspect of the present invention the composition further comprises an auxiliary material selected from ionic emulsifiers and sorbitan esters. Preferably the auxiliary material is selected from citric acid esters, diacetylated tartaric acid esters of monoglycerides, sorbitan esters, and lecithin.

We have surprisingly found that when the composition of the present invention contains an auxiliary material selected from ionic emulsifiers and sorbitan esters (such as citric acid esters, diacetylated tartaric acid esters of monoglycerides, sorbitan esters, and lecithin) it is not essential for the wax to be present in an amount of 10 to 40 wt. % and the compound to be present in an amount of 60 to 90 wt. %. The flexibility in the composition containing the auxiliary material when used as a coating may be sufficient at a large range of wax and compound amounts to achieve the necessary barrier properties without puncturing or cracking of the barrier. Thus in a further aspect the present provides a composition comprising i) wax, ii) a compound having the formula

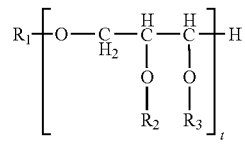

wherein t is an integer, wherein each $R_1$, $R_2$ and $R_3$ is independently selected from an acyl group or a hydrogen atom, wherein at least one of $R_1$, $R_2$ and $R_3$ is H or an acyl group (a short acyl group) having from 2 to 6 carbon atoms, wherein at least one of $R_1$, $R_2$ and $R_3$ is an optionally branched chain acyl group (a long acyl group) consisting of a saturated chain having 10 to 20 carbon atoms and an optional hydrophilic branch group, and iii) an auxiliary material selected from ionic emulsifiers and sorbitan esters (such as an emulsifier selected from citric acid esters, diacetylated tartaric acid esters of monoglycerides, sorbitan esters, and lecithin).

In a preferred aspect of the present invention the auxiliary material is present in an amount of from 0.1 to 1.0 wt. % based on the composition, preferably in an amount of from 0.25 to 0.75 wt. % based on the composition, more preferably in an amount of from 0.4 to 0.6 wt. % based on the composition, more preferably is present in an amount of approximately 0.5 wt. % based on the composition.

The composition may be prepared by any suitable process. One skilled in the art would be able to provide suitable processes for the preparation of the present composition.

In one preferred aspect the present invention is prepared by heating the compound (such as ACETEM) to a temperature above its melting point but below the melting point of the wax and contacting the compound with the wax. The composition may then be applied to a food material or allowed to cool.

Thus in a further aspect the present invention provides a process for the preparation of a composition comprising i) a wax and ii) a compound, having the formula

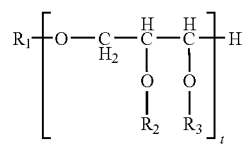

wherein t is an integer; wherein each $R_1$, $R_2$ and $R_3$ is independently selected from an acyl group or a hydrogen atom; wherein at least one of $R_1$, $R_2$ and $R_3$ is H or an acyl group (a short acyl group) having from 2 to 6 carbon atoms;

wherein at least one of $R_1$, $R_2$ and $R_3$ is an optionally branched chain acyl group (a long acyl group) consisting of a saturated chain having 10 to 20 carbon atoms and an optional hydrophilic branch group;

the process comprising the steps of (a) heating the compound to a temperature above its melting point but below the melting point of the wax and (b) contacting the compound with the wax.

Preferably the wax is present in an amount of 2 to 50 wt. % based on the composition Preferably the compound is present in an amount of 50 to 98 wt. % based on the composition In one aspect the composition formed in the above process may be milled or micro-milled. However, as small wax crystals are formed during the crystallisation of the composition, milling or micro-milling is not essential.

In a further aspect a composition in accordance with the present invention (irrespective of its process of production) may by heated to a temperature above the melting point of the compound (such as ACETEM) but below the melting point of the wax and then applied to a food material.

When the composition is prepared by heating or the composition is heated to heated to a temperature above the melting point of the compound (such as ACETEM) but below the melting point of the wax it forms a viscous fluid system. The viscous fluid system is able to absorb and retain the fluid compound inside the viscous fluid system thereby preventing migration of the fluid part into the food component on to which it is applied. Thus the composition becomes applicable as a heat stable barrier system in which the barrier may be applied or melted on a cold or medium tempered food item at which the barrier will crystallise. During the subsequent heating the barrier system will remain on the food item and not drain off or be absorbed into the food. In these aspects the barrier system may be heat stable up to approximately 75-80° C. if one selected high melting wax types.

We have found that the composition of the present invention, not only but particularly when prepared by the above process, provides a heat stable barrier. By "heat stable" it is meant a barrier system which can be heated to an elevated temperature without loosing functionality during the subsequent cooling. In particular the present composition provides a barrier system which remains at the point at which it is applied to a food material without draining off or be absorbed by the food component at the elevated temperature. This is believed to be achieved by maintenance of an internal structure at the elevated temperature which prevents the composition/barrier system from to flowing. The strength of this internal structure can be measured as yield stress. As can be seen from Examples 18A and 18B, the internal structure of the barrier system at the elevated temperature may be modified and controlled to provide a barrier system which may be thickened to a consistency ranging from a thin paste to a thick paste depending on the composition of the barrier system.

The heat stability of the composition/barrier system allows for use in production of food items which are heated or baked during the food preparation and where a water migration barrier is required. The heat stability of the composition/barrier system makes it possible to apply the barrier before the baking process.

Foodstuff

As described above in one aspect the present invention provides a coated foodstuff comprising (a) a foodstuff substrate, (b) a coating comprising a composition as defined herein.

The foodstuff may be selected from confectionery including sugar confectionery, chocolate, candy such as liquorice and water jellies, chewing gum, nuts; dairy products including cheese, whipped desserts, and ice cream; bakery products, either frozen or fresh and including bread, pizza, biscuits, crackers, cakes, pies; meat products including sausages, fish, ham, pork and beef, such as joints of pork or beef; fresh and dried fruit; and snacks.

In one preferred aspect the foodstuff comprises one or more food materials at least one of which is coated with the present composition. This is particularly advantageous because in such applications, it is often required to mix different food materials having different water contents. The present composition may prevent or reduce movement of water from one food material to another, which may result in degradation of the foodstuff.

The foodstuff may comprise more than one coating layer on any given surface, for example two coating layers. The multiple coating layers may comprise a plurality of layers consisting of a composition in accordance with the present invention or may comprises layers of a composition in accordance with the present invention together with one or more layers not formed from the present composition.

In a preferred aspect the foodstuff may first be coated with a compound as defined herein and subsequently coated with a composition as defined herein. Thus the present invention may provide a foodstuff comprising a (a) a foodstuff substrate and a first coating material, wherein the first coating material is a compound as defined herein, (b) a second coating material applied on the first coating material and comprising a composition as defined herein.

We have surprisingly found that when a foodstuff is coated with a system comprising a least two layers such as that described above it is not essential for the wax to be present in an amount of 10 to 40 wt. % and the compound to be present in an amount of 60 to 90 wt. %. The flexibility in the composition when used as a coating may be sufficient at a large range of wax and compound amounts to achieve the necessary barrier properties without puncturing or cracking of the barrier. It is believed that this results from the flexibility of the first coating material moderating movement of the food substrate with respect to the second coating material. Consequently the forces on the second coating material are moderated.

Thus in a further aspect the present provides a coated foodstuff comprising a (a) a foodstuff substrate and a first coating material, wherein the first coating material is a compound having the formula

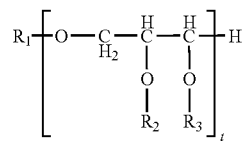

wherein t is an integer, wherein each $R_1$, $R_2$ and $R_3$ is independently selected from an acyl group or a hydrogen atom, wherein at least one of $R_1$, $R_2$ and $R_3$ is H or an acyl group (a short acyl group) having from 2 to 6 carbon atoms, wherein at least one of $R_1$, $R_2$ and $R_3$ is an optionally branched chain acyl group (a long acyl group) consisting of a saturated chain having 10 to 20 carbon atoms and an optional hydrophilic branch group (b) a second coating composition applied on the first coating material, wherein the second coating composition comprises i) a wax, ii) a compound having the formula

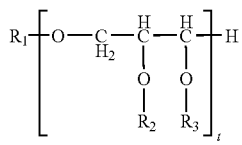

wherein t is an integer, wherein each $R_1$, $R_2$ and $R_3$ is independently selected from an acyl group or a hydrogen atom, wherein at least one of $R_1$, $R_2$ and $R_3$ is H or an acyl group (a short acyl group) having from 2 to 6 carbon atoms, wherein at least one of $R_1$, $R_2$ and $R_3$ is an optionally branched chain acyl group (a long acyl group) consisting of a saturated chain having 10 to 20 carbon atoms and an optional hydrophilic branch group.

It will be appreciated by one skilled in the art that the composition of the present invention may be utilised to prevent water from ingress into a material, such as a foodstuff, or may be used to retain water within a material, such as a foodstuff. In one aspect of the invention the present composition is applied to prevent ingress of water in to foodstuff wherein the foodstuff is a cracker.

In one alternative the present invention may be used in or to coat medicinal products, including pharmaceutical products and veterinary products.

The present invention will now be described in further detail in the following examples.

EXAMPLES

Method

Water Vapour Permeability

Water vapour coefficients were measured using a SGA-100 Vapour Sorption Analyser from VTI Corporation 7650 West 26$^{th}$ Ave., Hialeah, Fla. 33016 USA. An aluminium cup of 2 cm in diameter was partly filled with deionised and de-aerated water leaving 3-5 mm free head space. On top of the cup a film consisting of the barrier composition was placed. The cup had a small flange to which the film was sealed with a high vacuum grease purchased from Dow Corning GmbH, 65201 Wiesbaden, Germany. Water phases other than pure water can be used. Pure water secures a water activity of 1 at any test temperature. Using a salty solution instead of water reduces the water activity and any desired water activity can be reached by adjusting the salt concentration or the type of salt in the water phase.

The cup was placed in the weighing chamber of the VTI instrument. The temperature and relative humidity was adjusted to test conditions and weight loss was registered and monitored over time. The test temperature could be varied between 5-80° C. and relative humidity could be adjusted between 0 and 100%.

The film was prepared by melting the barrier composition to 80° C. and carefully blending all ingredients to a homogeneous system.

A small (3×5 cm) nylon filter, having no resistance to water migration and water evaporation, was placed on top of a hot microscope slide with a small pin in each end of the slide. The height of the pins could be varied. Hot and melted barrier composition was gently poured on top of the filter and another hot microscope slide was placed on top of the pins and the barrier composition was allowed to cool and crystallise. After complete crystallisation the glasses were gently removed and the film was transferred to the aluminium cup and sealed. The nylon filter provides a support matrix for the barrier composition. Another way of preparing the film was to immerse the nylon filter directly into the hot and melted barrier composition and allow it to crystallise before sealing it on top of the aluminium cup.

The monitoring of the weight loss due to water migration through the film and subsequent water evaporation was continued for 5-600 minutes.

The weight was then plotted vs. time leaving out the first 100 min, which was used to adapt to the specific measuring conditions in the beginning of each trial.

The slope of the plotted line was determined. The slope equals (area through which the water migrates)×(the difference in water vapour pressure across the film)×(the ratio between the permeability coefficient and film thickness). The film thickness was measured after each experiment with a micrometer using the average of 4 measurements. The area of the film was calculated from the diameter. The difference in water vapour pressure was controlled by the water phase composition in the aluminium cup and by the relative humidity in the weighing chamber of the VTI instrument.

With pure water in the cup the head space above the water surface has a relative humidity of 100%. The water vapour pressure in the head space was then 100% of the saturated water vapour pressure at the specific test temperature. Adjusting the relatively humidity in the weighing chamber of the VTI instrument resulted in a water vapour pressure of 15% of the saturated water vapour pressure at the specific test temperature.

The overall driving force for water migration and evaporation from the film was then 85% of the saturated water vapour pressure at the test temperature.

10 to 15 films of each barrier composition were prepared and analysed as above. For all samples the ratio between the permeability coefficient and the film thickness was plotted against the reciprocal film thickness. The slope of this line equals the permeability coefficient.

Example 1

Distilled monoglyceride acetylated to 70% with a fatty acid composition mainly comprised of stearic acid and palmitic acid was analysed at 25° C. with a water vapour pressure difference of 20.2 mmHg. The permeability coefficient was calculated to 995 mg mm/m² mmHg min.

Example 2

Distilled monoglyceride acetylated to 70% with a fatty acid composition mainly comprised of stearic acid and palmitic acid was analysed at 5° C. with a water vapour pressure difference of 5.5 mmHg. The permeability coefficient was calculated to 721 mg mm/m² mmHg min.

Example 3

White beeswax was analysed at 25° C. with a water vapour pressure difference of 20.2 mmHg. The permeability coefficient was calculated to 14 mg mm/m² mmHg min.

Example 4

Distilled monoglyceride acetylated to 70% and a fatty acid composition comprising mainly of stearic acid and palmitic acid was provided in an amount of 50% and heated to 80° C., 50% white beeswax was added, melted and carefully mixed with the acetylated monoglyceride by agitation. The films were prepared as described above using microscope slides. The permeability coefficient was measured and calculated at 5° C. and yielded 20 mg mm/m² mmHg min.

Example 5

Distilled monoglyceride acetylated to more than 99% and a fatty acid composition comprised of mainly stearic acid and palmitic acid was mixed in a 90-10 ratio with white beeswax as described in Example 4 and analysed at 5° C. The permeability coefficient was calculated to 82 mg mm/m² mmHg min.

Example 6

Distilled monoglycerides acetylated to 70% with a fatty acid composition comprising of mainly stearic and palmitic acid was provided in an amount of 95% and mixed with 5% white beeswax as described in Example 4 and analysed at 5° C. The permeability coefficient was calculated to 115 mg mm/m² mmHg min.

Example 7

Distilled monoglyceride acetylated to 70% with a fatty acid composition comprising of mainly stearic acid and palmitic acid was provided in an amount of 90% and mixed with 10% white beeswax as described in Example 4 and analysed at 5° C. The permeability coefficient was calculated to 32 mg mm/m² mmHg min.

Example 8

A commercial product from Loders Croklaan Hogeweg 1, 1521 AZ, Wormerveer, Netherland, Coatbar A, which is a triglyceride composition was prepared as described in Example 4 without the use of beeswax and analysed at 5° C. The product was very brittle and easily formed cracks and holes. Furthermore it melted partly at ambient temperature and became soft. The permeability coefficient was calculated to 166 mg mm/m² mmHg min.

Texture

Samples of barrier compositions were melted and carefully mixed at 80° C. and poured into cylindrical glass beakers 6 cm in diameter and approximately 5 cm tall. After 3 days of storage at the test temperature the consistency of the samples were analysed by use of a Texture Analyser TA-XT2 from Stable Micro Systems, Vienna Court, Lammas ad, Godalmng, Surrey GU7 1YL, UK, equipped with a 2 mm P2 DIA CYLINDER STAINLESS probe. The probe penetrated the samples in one cycle with a prespeed of 2.0 mm/s and a penetrating speed of 0.5 mm/s. Distance was set to 10.0 mm and post speed was 2.0 mm/s. Trigger weight was 3.0 g.

Each measurement provided a graph showing the force in gram required to penetrate the samples vs. time. All curves exhibited the same basic shape with an initial steep raising and an inflection point where the slope of the graph decreases.

The measured force in gram at the inflection point (from now on called inflection force) was used for comparison between the samples. A decrease in the measured force at the deflection point was seen for softer and more elastic compositions.

Example 9

The inflection force for different barrier compositions are shown below:

| Barrier composition | | Inflection force g at 5° C. | Inflection force g at 20° C. |
|---|---|---|---|
| 100% | Acetylated monoglycerides from ex 5 | 165 | |
| 90% | Acetylated monoglycerides from ex 5 + 10% white beeswax | 500 | |
| 80% | Acetylated monoglycerides from ex 5 + 20% white beeswax | 1000 | |
| 100% | White beeswax | 4000 | 2200 |
| 20% | Acetylated monoglyceride from ex 1 + 80% white beeswax | 3400 | |
| 50% | Acetylated monoglyceride from ex 1 + 50% white beeswax | 2700 | |
| 60% | Acetylated monoglyceride from ex 1 + 40% white beeswax | 2000 | |
| 70% | Acetylated monoglyceride from ex 1 + 30% white beeswax | 1700 | |
| 80% | Acetylated monoglyceride from ex 1 + 20% white beeswax | 1400 | 700 |
| 90% | Acetylated monoglyceride from ex 1 + 10% white beeswax | 900 | 400 |
| 100% | Acetylated monoglyceride from ex 1 + | 340 | 200 |

Solid Fat Content

Mixtures of acetylated monoglycerides listed in Example 9 and white beeswax in different proportions ranging from pure beeswax to pure acetylated monoglycerides were tempered according to IUPAC 2.150a standard tempering method and the SFC (solid fat content) was measured on Bruker NMS 120 Minispec NMR Analyser, 762287 Rheinstetten, Germany, at 5° C. and 20° C. The results show a linear relationship between mixing ratio of the acetylated monoglycerides and the white beeswax and the SFC without any sign of eutectic effect, which would have seriously damaged the water vapour barrier properties. The SFC measurements also showed that especially the acetylated monoglyceride listed in Example 1 mixed with white beeswax only looses approximately 2% point of the total solid fat content when heated from 5° C. to 20° C. The barrier is then able to persist temperature fluctuations.

| Barrier composition | | SFC at 5° C. | SFC at 20° C. |
|---|---|---|---|
| 100% | White beeswax | 93.8 | 90.6 |
| 20% | Acetylated monoglyceride from ex no 1 + 80% white beeswax | 94.0 | 89.9 |
| 50% | Acetylated monoglyceride from ex 1 + 50% white beeswax | 92.9 | 89.8 |
| 60% | Acetylated monoglyceride from ex 1 + 40% white beeswax | 92.5 | 89.5 |
| 70% | Acetylated monoglyceride from ex 1 + 30% white beeswax | 92.2 | 89.6 |
| 80% | Acetylated monoglyceride from ex 1 + 20% white beeswax | 91.9 | 89.5 |
| 90% | Acetylated monoglyceride from ex 1 + 10% white beeswax | 91.5 | 89.3 |
| 100% | Acetylated monoglyceride from ex 1 | 90.9 | 88.9 |

Application

Example 10

A model application system was prepared by spraying approximately 400 mm on a square cracker, namely a Barber Cream Cracker, produced by The Horizon Biscuit Company Ltd. Pasture Road, Moreton, Merseyside CH46 SE England. The melted 80° C. hot barrier compositions were sprayed on the cracker in a 4-run-cycle on both sides on a conveyor belt. Between each cycle the cracker was turned 90°. Prior to the heating the cracker was preheated for a few seconds in 50-60° C. hot air. After adapting to ambient room temperature for 1 hour a carrageenan gel was placed on top of the cracker. The gel had a water activity of 1 and it was prepared by dissolving 0.2% $CaCl_2$ and 0.2% KCl in distilled water and adding 3% carrageenan, during slow agitation. After heating the water to 85-90° C. 0.1% Na-benzoate was added. After cooling to less than 75° C. 0.6% citric acid solution was added (50% w/w). The liquid gel phase was poured in glass beakers and stored at 5° C.

The water activity of the cracker was 0.2 at 22° C.

Before applying the gels on the top of the crackers all crackers were weighed (zero-value). The crackers with gels placed on the top were stored at 5° C. Over the following days 10 crackers were weighed each day after gentle removal of the gel. The gel did not stick to the cracker.

For each cracker the respective zero-value was subtracted from the daily weight and the weight gain was calculated as the average of the 10 zero-value corrected measurements.

A barrier formulation as described in Example 1 was used and the weight gain (gram water per gram cracker) due to water migration was

| | |
|---|---|
| Day 1 | 0.8 g |
| Day 2 | 1.5 g |
| Day 4 | 2.2 g |
| Day 7 | 2.8 g |
| Day 14 | 3.5 g |

A cracker with no barrier system applied but treated similarly resulted in the following results:

| | |
|---|---|
| Day 1 | 1.8 g |
| Day 2 | 2.2 g |
| Day 4 | 3.2 g |

Example 11

A barrier system as described in Example 3 was tested as described in Example 10. The following weight gain due to water absorption was recorded.

| | |
|---|---|
| Day 1 | 0.9 g |
| Day 2 | 1.6 g |
| Day 4 | 2.8 g |
| Day 7 | 3.5 g |
| Day 10 | 4.1 g |
| Day 14 | 4.3 g |

Example 12

A barrier system as described in Example 4 was tested as described in Example 10 and it provided the following weight gain results due to water migration:

| | |
|---|---|
| Day 1 | 0.1 g |
| Day 4 | 0.5 g |
| Day 7 | 1.4 g |
| Day 10 | 2.0 g |
| Day 14 | 2.6 g |

Example 13

A barrier system made of 20% pure white beeswax and 80% acetylated monoglycerides with a fatty acid composition comprising of mainly stearic and palmitic acid was applied on the crackers as described in Example 10. The weight gain due to water migration was:

| | |
|---|---|
| Day 2 | 0.1 g |
| Day 4 | 0.2 g |
| Day 8 | 0.5 g |
| Day 14 | 0.8 g |

Example 14

A barrier system as described in Example 1 was applied in 150 mm thickness as described in Example 10 followed by application of a new barrier layer on top of the first one. The second barrier system was similar to the barrier system described in Example 13. The weight gain due to water migration was:

| | |
|---|---|
| Day 2 | 0.1 g |
| Day 4 | 0.2 g |
| Day 8 | 0.3 g |
| Day 12 | 0.5 g |
| Day 16 | 0.6 g |

Example 15

A barrier system as described in Example 1 was applied on 75 mm thickness as described in Example 10 followed by application of 150 mm of the barrier system described in Example 13. On top of the second barrier layer new 75 mm layer of the barrier system described in Example 1 was applied. The weight gain due to water migration was:

| | |
|---|---|
| Day 1 | 0.1 g |
| Day 5 | 0.2 g |
| Day 12 | 0.4 g |
| Day 16 | 0.5 g |

Example 16

Distilled monoglyceride acetylated to 70% with a fatty acid composition comprising mainly stearic and palmitic acid was mixed in an amount of 80% with 20% white beeswax as described in Example 4. The barrier system was applied on crackers as described in Example 10 in 300 mm with the change that the applied gel had a water activity of 0.62.

The gel was prepared by premix 2% GRINDSTED$^{RTM}$ PECTIN CF 140B, from DANISCO A/S, Brabrand, Denmark, with 3% sugar and 20% water. The premix was added to a boiling mixture of 66% white sugar syrup 80% SS and 25% sugar. The mixture and the premix were boiled until a weight of 100% followed by addition of citric acid.

The weight gain due to water migration was:

| | |
|---|---|
| Day 1 | 0.01 g |
| Day 2 | 0.04 g |
| Day 5 | 0.05 g |
| Day 8 | 0.11 g |
| Day 16 | 0.17 g |

Example 17

A barrier system as described in Example 7 was prepared with the change that standard soy lecithin, was melted into the original barrier mixture in the following concentrations: 0.05%, 0.1%, 0.2% and 0.3%. The texture of the barrier system was evaluated as described in "Texture" with the change that the force at 10 mm penetration was registered instead of the inflection force.

| Lecithin | Force g at 10 mm 5° C. |
|---|---|
| 0% | 2488 |
| 0.05% | 2752 |
| 0.10% | 2592 |
| 0.20% | 2406 |
| 0.30% | 2971 |

Example 18A

Acetylated distilled monoglycerides as described in Example 4 were mixed with 20% carnauba wax and melted and mixed at 90° C. followed by cooling and crystallisation at room temperature. After further 24 hours storage at room temperature the mixture was heated to 60° C. and the yield stress was measured at 60° C. on a Reological StressTech reometer using a CC 25 CCE measuring probe. The applied stress sweep clearly showed the yield 10 stress and the subsequent break down of the internal structure when the applied stress was higher than the yield stress. The yield stress curve is shown in FIG. 1. The yield stress was analysed to 0.1 Pa at 60° C.

Example 18B

Figure 2:
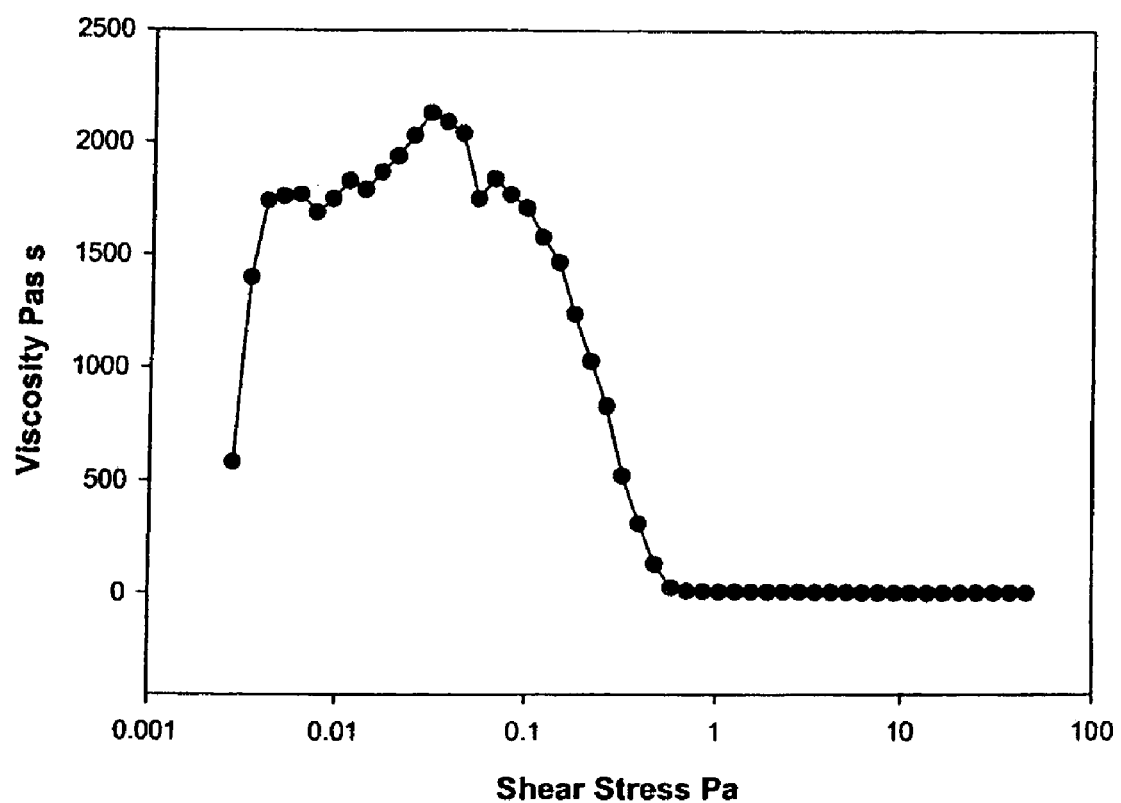
FIG. 2 shows a yield stress curve.

Acetylated distilled monoglycerides as described in Example 18A were mixed and melted with 30% carnauba wax at 90° C. and treated similar as in Example 18A except that the yield stress measurement was performed at 70° C. The yield stress curve is shown in FIG. 2. The yield stress was analysed to 0.1 Pa.

Comments—The internal structure of the barrier system breaks down in both cases (Examples 18A and 18B) at a shear stress of 0.1 Pa. As long as the structure is intact the sample resists to flow and it is able to overcome increased stress applied form the instrument. This increased resistance to flow is measured as an viscosity increase. As soon the structure breaks down the measured viscosity decreases rapidly. This takes place at 0.1 Pa.

Example 19

A barrier system as described in Example 13 was applied to crackers at a thickness of 400 mm in the manner described in Example 10. A gel, prepared in accordance with Example 16, having a water activity of 0.79 was placed on top of the crackers. The weight gain of the crackers due to water migration at 20° C. was found to be:

| | |
|---|---|
| Reference after one day of storage: | 10% weight increase. |
| Sample with 400 mm barrier system: | 2.1% weight increase after 2 days of storage |
| Sample with 400 mm barrier system: | 6% weight increase after 7 days of storage |
| Sample with 400 mm barrier system: | 9% weight increase after 14 days of storage |

All publications mentioned in the above specification are herein incorporated by reference. Various modifications and variations of the described methods and system of the invention will be apparent to those skilled in the art without departing from the scope and spirit of the invention. Although the invention has been described in connection with specific preferred embodiments, it should be understood that the invention as claimed should not be unduly limited to such specific embodiments. Indeed, various modifications of the described modes for carrying out the invention which are obvious to those skilled in chemistry or related fields are intended to be within the scope of the following claims.

The invention will now be further described by the following numbered paragraphs:

1. A composition comprising
   i) a wax in an amount of 2 to 50 wt. % based on the composition
   ii) a compound in an amount of 50 to 98 wt. % based on the composition, having the formula

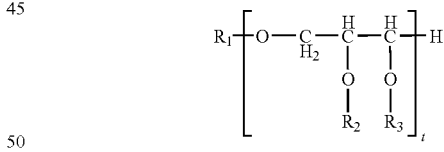

wherein t is an integer
   wherein each $R_1$, $R_2$ and $R_3$ is independently selected from an acyl group or a hydrogen atom,
   wherein at least one of $R_1$, $R_2$ and $R_3$ is H or an acyl group (a short acyl group) having from 2 to 6 carbon atoms
   wherein at least one of $R_1$, $R_2$ and $R_3$ is an optionally branched chain acyl group (a long acyl group) consisting of a saturated chain having 10 to 20 carbon atoms and an optional hydrophilic branch group.

2. A composition according to paragraph 1 wherein the wax is selected from beeswax, candelilla wax, carnauba wax, jojoba wax, whale wax, paraffin wax, mineral wax, and microcrystalline wax.

3. A composition according to paragraph 1 or 2 wherein the wax is beeswax.

4. A composition according to any one of the preceding paragraphs wherein at least one of $R_1$, $R_2$ and $R_3$ is an acyl group (a short acyl group) having from 2 to 6 carbon atoms.

5. A composition according to any one of the preceding paragraphs wherein at least one of $R_1$, $R_2$ and $R_3$ is a branched chain acyl group (a long acyl group).

6. A composition according to paragraph 5 wherein at least one of $R_1$, $R_2$ and $R_3$ is a branched chain acyl group (a long acyl group) consisting of a saturated chain having 10 to 20 carbon atoms and a hydrophilic branch group.

7. A composition according to any one paragraphs 1 to 4 wherein at least one of $R_1$, $R_2$ and $R_3$ is an unbranched acyl group.

8. A composition according to paragraph 7 wherein at least one of $R_1$, $R_2$ and $R_3$ is an unbranched chain acyl group (a long acyl group) consisting of a saturated chain having 10 to 20 carbon atoms.

9. A composition according to any one of paragraphs 1 to 4 wherein the or each long acyl group is unbranched.

10. A composition according to any one of the preceding paragraphs wherein t is from 1 to 10.

11. A composition according to paragraph 10 wherein t is from 1 to 5

12. A composition according to paragraph 11 wherein t is 1 or 2.

13. A composition according to any one of the preceding paragraphs wherein the compound is of the formula

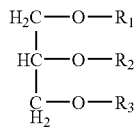

14. A composition according to any one of the preceding paragraphs wherein at least one of $R_1$, $R_2$ and $R_3$ is H, and at least one of $R_1$, $R_2$ and $R_3$ is an acyl group (a long acyl group) consisting of a saturated chain having 10 to 20 carbon atoms.

15. A composition according to any one of paragraphs 1 to 13 wherein at least one of $R_1$, $R_2$ and $R_3$ is an acyl group (a short acyl group) having from 2 to 6 carbon atoms, and at least one of $R_1$, $R_2$ and $R_3$ is an unbranched chain acyl group (a long acyl group) consisting of a saturated chain having 10 to 20 carbon atoms.

16. A composition according to paragraph 15 wherein two of $R_1$, $R_2$ and $R_3$ are the short acyl groups and wherein the other of $R_1$, $R_2$ and $R_3$ is a long acyl group.

17. A composition according to paragraph 15 or 16 wherein the short acyl group is present in an amount, on average, of no greater than 2 moles per mole of glycerol and esters thereof.

18. A composition according to paragraph 15 or 16 wherein the long acyl group is present in an amount, on average, of at least 0.4 moles, preferably from 0.9 to 2 moles, more preferably from 0.9 to 1 moles per mole of glycerol and esters thereof.

19. A composition according to paragraph 15 or 16 wherein the total amount of the acyl groups is, on average, 0.8 to 3.0 moles per mole of glycerol and esters thereof.

20. A composition according to any one of the preceding paragraphs wherein the chain of the long acyl group consists of a chain having 14 to 20 carbon atoms.

21. A composition according to paragraph 20 wherein the chain of the long acyl group consists of a chain having 16 to 20 carbon atoms.

22. A composition according to any one of the preceding paragraphs wherein the short acyl group is an acyl group having from 2 to 5 carbon atoms.

23. A composition according to paragraph 22 wherein the short acyl group is an acyl group having 2 carbon atoms.

24. A composition according to any one of the preceding paragraphs wherein the compound is an acetylated interesterification product of glycerol and an oil selected from fully hydrogenated, partly hydrogenated and non-hydrogenated fats and oils including palm oil, soy oil, rape seed oil, high erusic rape seed oil, sunflower oil, safflower oil, corn oil, cottonseed oil, lard, tallow, palm kernel oil, coconut oil, peanut oil, castor oil and fractions thereof.

25. A composition according to any one of the preceding paragraphs wherein the wax is present in an amount of 2 to 40 wt. % based on the composition.

26. A composition according to any one of the preceding paragraphs wherein the wax is present in an amount of 5 to 40 wt. % based on the composition.

27. A composition according to any one of the preceding paragraphs wherein the wax is present in an amount of 10 to 40 wt. % based on the composition.

28. A composition according to any one of the preceding paragraphs wherein the wax is present in an amount of 10 to 30 wt. % based on the composition.

29. A composition according to any one of the preceding paragraphs wherein the wax is present in an amount of 15 to 25 wt. % based on the composition.

30. A composition according to any one of the preceding paragraphs wherein the wax is present in an amount of approximately 20 wt. % based on the composition.

31. A composition according to any one of the preceding paragraphs wherein the compound is present in an amount of 60 to 98 wt. % based on the composition.

32. A composition according to any one of the preceding paragraphs wherein the compound is present in an amount of 60 to 95 wt. % based on the composition.

33. A composition according to any one of the preceding paragraphs wherein the compound is present in an amount of 60 to 90 wt. % based on the composition.

34. A composition according to any one of the preceding paragraphs wherein the compound is present in an amount of 70 to 90 wt. % based on the composition.

35. A composition according to any one of the preceding paragraphs wherein the compound is present in an amount of 75 to 85 wt. % based on the composition.

36. A composition according to any one of the preceding paragraphs wherein the compound is present in an amount of approximately 80 wt. % based on the composition.

37. A composition according to any one of the preceding paragraphs wherein the composition further comprises (iii) an auxiliary material selected from ionic emulsifiers and sorbitan esters.

38. A composition according to paragraph 37 wherein auxiliary material is selected from citric acid esters, diacetylated tartaric acid esters of monoglycerides, sorbitan esters, and lecithin 39. A composition according to paragraph 37 or 38 wherein the auxiliary material is present in an amount of from 0.1 to 1.0 wt. % based on the composition.

40. A composition according to paragraph 39 wherein the auxiliary material is present in an amount of from 0.25 to 0.75 wt. % based on the composition.

41. A composition according to paragraph 39 wherein the auxiliary material is present in an amount of from 0.4 to 0.6 wt. % based on the composition.

42. A composition according to paragraph 39 wherein the auxiliary material is present in an amount of approximately 0.5 wt. % based on the composition.

43. A coated foodstuff comprising
(a) a foodstuff substrate
(b) a coating comprising a composition as defined in any one of the preceding paragraphs.

44. A foodstuff according to paragraph 43, comprising a
(a) a food stuff substrate and a first coating material
(b) a second coating material applied on the first coating material and comprising a composition as defined in any one of the preceding paragraphs.

45. A foodstuff according to paragraph 44 wherein the first coating material is a compound as defined in any one of paragraphs 1 to 42.

46. A foodstuff according to paragraph 43, 44 or 45 wherein the foodstuff is selected from confectionery including sugar confectionery, chocolate, candy such as liquorice and water jellies, chewing gum, nuts; dairy products including cheese, whipped desserts, and ice cream; bakery products, either frozen or fresh and including bread, pizza, biscuits, crackers, cakes, pies; meat products including sausages, fish, ham, pork and beef, such as joints of pork or beef; fresh and dried fruit; and snacks.

47. A process for preparing a coated foodstuff, comprising coating a foodstuff with a composition as defined in any one of the paragraphs 1 to 42.

48. A medicinal product comprising a composition as defined in any one of the preceding paragraphs.

49. A medicinal product according to paragraph 48 wherein the medicinal product is a pharmaceutical product or a veterinary product.

50. A process for preparing a coating composition, the process comprising the step of contacting
i) a wax in an amount of 2 to 50 wt. % based on the composition; and
ii) a compound in an amount of 50 to 98 wt. % based on the composition, having the formula

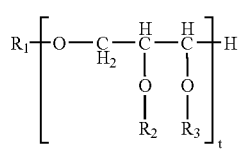

wherein t is an integer
wherein each $R_1$, $R_2$ and $R_3$ is independently selected from an acyl group or a hydrogen atom,
wherein at least one of $R_1$, $R_2$ and $R_3$ is H or an acyl group (a short acyl group) having from 2 to 6 carbon atoms
wherein at least one of $R_1$, $R_2$ and $R_3$ is an optionally branched chain acyl group (a long acyl group) consisting of a saturated chain having 10 to 20 carbon atoms and an optional hydrophilic branch group.

51. A kit comprising
i) a wax; and
ii) a compound having the formula

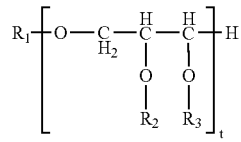

wherein t is an integer
wherein each $R_1$, $R_2$ and $R_3$ is independently selected from an acyl group or a hydrogen atom,
wherein at least one of $R_1$, $R_2$ and $R_3$ is H or an acyl group (a short acyl group) having from 2 to 6 carbon atoms
wherein at least one of $R_1$, $R_2$ and $R_3$ is an optionally branched chain acyl group (a long acyl group) consisting of a saturated chain having 10 to 20 carbon atoms and an optional hydrophilic branch group;
wherein the kit is formulated to provide the wax in an amount of 2 to 50 wt. % based on the composition, and the compound in an amount of 50 to 98 wt. % based on the composition.

52. Use of a composition for preventing and/or reducing migration of water into or out of a material, wherein the composition comprises
i) a wax in an amount of 2 to 50 wt. % based on the composition; and
ii) a compound in an amount of 50 to 98 wt. % based on the composition, having the formula

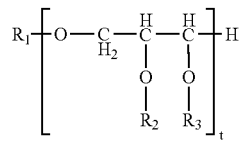

wherein t is an integer
wherein each $R_1$, $R_2$ and $R_3$ is independently selected from an acyl group or a hydrogen atom,
wherein at least one of $R_1$, $R_2$ and $R_3$ is H or an acyl group (a short acyl group) having from 2 to 6 carbon atoms
wherein at least one of $R_1$, $R_2$ and $R_3$ is an optionally branched chain acyl group (a long acyl group) consisting of a saturated chain having 10 to 20 carbon atoms and an optional hydrophilic branch group.

53. A composition according to paragraph 1 as substantially hereinbefore described.

54. A foodstuff according to paragraph 43 as substantially hereinbefore described.

55. A process according to paragraph 47 as substantially hereinbefore described.

56. A medicinal product according to paragraph 48 as substantially hereinbefore described.

57. A process according to paragraph 50 as substantially hereinbefore described.

58. A kit according to paragraph 51 as substantially hereinbefore described.

59. A use according to paragraph 52 as substantially hereinbefore described.

The invention claimed is:

1. A multi-component foodstuff comprising:
   (a) a first food material;
   (b) a barrier composition; and
   (c) a second food material wherein the first food material is coated with the barrier composition such that the barrier composition prevents or reduces movement of water from one food material to the other food material;
   wherein the first food material and the second food material are different food materials having different water contents, wherein the first food material, barrier composition and the second food material are edible and the barrier composition is present in the foodstuff in such a way that its organoleptic properties of taste, after taste and mouthfeel are imperceptible, whereby a consumer of the foodstuff is not aware of the barrier composition when the foodstuff is consumed; and
   wherein the barrier composition comprises
   i) a wax in an amount of 2 to 50 wt. % based on the composition
   ii) a compound in an amount of 50 to 98 wt. % based on the composition, having the formula

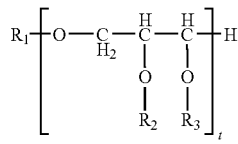

wherein t is an integer
   wherein each $R_1$, $R_2$ and $R_3$ is independently selected from an acyl group or a hydrogen atom,
   wherein at least one of $R_1$, $R_2$ and $R_3$ is H or an acyl group having from 2 to 6 carbon atoms (short acyl group)
   wherein at least one of $R_1$, $R_2$ and $R_3$ is an optionally branched chain acyl group consisting of a saturated chain having 10 to 20 carbon atoms and an optional hydrophilic branch group (long acyl group).

2. The foodstuff according to claim 1 wherein the wax is selected from beeswax, candelilla wax, carnauba wax, jojoba wax, whale wax, paraffin wax, mineral wax, and microcrystalline wax.

3. The foodstuff according to claim 2 wherein the wax is beeswax.

4. The foodstuff according to claim 1 wherein at least one of $R_1$, $R_2$ and $R_3$ is an acyl group having from 2 to 6 carbon atoms.

5. The foodstuff according to claim 1 wherein at least one of $R_1$, $R_2$ and $R_3$ is a branched chain acyl group.

6. The foodstuff according to claim 5 wherein at least one of $R_1$, $R_2$ and $R_3$ is a branched chain acyl group consisting of a saturated chain having 10 to 20 carbon atoms and a hydrophilic branch group.

7. The foodstuff according to claim 1 wherein at least one of $R_1$, $R_2$ and $R_3$ is an unbranched acyl group.

8. The foodstuff according to claim 7 wherein at least one of $R_1$, $R_2$ and $R_3$ is an unbranched chain acyl group consisting of a saturated chain having 10 to 20 carbon atoms.

9. The foodstuff according to claim 1 wherein the one or more each optionally branched acyl group is unbranched.

10. The foodstuff according to claim 1 wherein t is from 1 to 10.

11. The foodstuff according to claim 10 wherein t is from 1 to 5.

12. The foodstuff according to claim 11 wherein t is 1 or 2.

13. The foodstuff according to claim 1 wherein the compound is of the formula

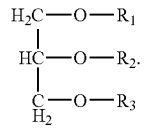

14. The foodstuff according to claim 1 wherein at least one of $R_1$, $R_2$ and $R_3$ is H, and at least one of $R_1$, $R_2$ and $R_3$ is an acyl group consisting of a saturated chain having 10 to 20 carbon atoms.

15. The foodstuff according to claim 1 wherein at least one of $R_1$, $R_2$ and $R_3$ is an acyl group having from 2 to 6 carbon atoms, and at least one of $R_1$, $R_2$ and $R_3$ is an unbranched chain acyl group consisting of a saturated chain having 10 to 20 carbon atoms.

16. The foodstuff according to claim 15 wherein two of $R_1$, $R_2$ and $R_3$ are acyl groups having from 2 to 6 carbon atoms and wherein the other of $R_1$, $R_2$ and $R_3$ is an unbranched chain acyl group consisting of a saturated chain having 10 to 20 carbon atoms.

17. The foodstuff according to claim 15 wherein the acyl group having from 2 to 6 carbon atoms is present in an average amount of no greater than 2 moles per mole of glycerol and esters thereof.

18. The foodstuff according to claim 15 wherein the unbranched chain acyl group consisting of a saturated chain having 10 to 20 carbon atoms is present in an average amount of at least 0.4 moles per mole of glycerol and esters thereof.

19. The foodstuff according to claim 18 wherein the unbranched chain acyl group consisting of a saturated chain having 10 to 20 carbon atoms is present in an average amount of from 0.9 to 2 moles per mole of glycerol and esters thereof.

20. The foodstuff according to claim 18 wherein the unbranched chain acyl group consisting of a saturated chain having 10 to 20 carbon atoms is present in an average amount of at least from 0.9 to 1 moles per mole of glycerol and esters thereof.

21. The foodstuff according to claim 15 wherein the average total amount of the acyl groups is 0.8 to 3.0 moles per mole of glycerol and esters thereof.

22. The foodstuff according to claim 1 wherein the chain of the long acyl group consists of a chain having 14 to 20 carbon atoms.

23. The foodstuff according to claim 22 wherein the chain of the long acyl group consists of a chain having 16 to 20 carbon atoms.

24. The foodstuff according to claim 1 wherein the short acyl group is an acyl group having from 2 to 5 carbon atoms.

25. The foodstuff according to claim 24 wherein the short acyl group is an acyl group having 2 carbon atoms.

26. The foodstuff according to claim 1 wherein the compound is an acetylated interesterification product of glycerol and an oil selected from fully hydrogenated, partly hydrogenated and non-hydrogenated fats and oils including palm oil, soy oil, rape seed oil, high erusic rape seed oil, sunflower oil, safflower oil, corn oil, cottonseed oil, lard, tallow, palm kernel oil, coconut oil, peanut oil, castor oil and fractions thereof.

27. The foodstuff according to claim 1 wherein the wax is present in an amount of 2 to 40 wt. % based on the composition.

28. The foodstuff according to claim 27 wherein the wax is present in an amount of 5 to 40 wt. % based on the composition.

29. The foodstuff according to claim 27 wherein the wax is present in an amount of 10 to 40 wt. % based on the composition.

30. The foodstuff according to claim 27 wherein the wax is present in an amount of 10 to 30 wt. % based on the composition.

31. The foodstuff according to claim 27 wherein the wax is present in an amount of 15 to 25 wt. % based on the composition.

32. The foodstuff according to claim 27 wherein the wax is present in an amount of approximately 20 wt. % based on the composition.

33. The foodstuff according to claim 1 wherein the compound is present in an amount of 60 to 98 wt. % based on the composition.

34. The foodstuff according to claim 33 wherein the compound is present in an amount of 60 to 95 wt. % based on the composition.

35. The foodstuff according to claim 33 wherein the compound is present in an amount of 60 to 90 wt. % based on the composition.

36. The foodstuff according to claim 33 wherein the compound is present in an amount of 70 to 90 wt. % based on the composition.

37. The foodstuff according to claim 33 wherein the compound is present in an amount of 75 to 85 wt. % based on the composition.

38. The foodstuff according to claim 33 wherein the compound is present in an amount of approximately 80 wt. % based on the composition.

39. The foodstuff according to claim 1 wherein the composition further comprises
(iii) an auxiliary material selected from ionic emulsifiers and sorbitan esters.

40. The foodstuff according to claim 39 wherein auxiliary material is selected from citric acid esters, diacetylated tartaric acid esters of monoglycerides, sorbitan esters, and lecithin.

41. The foodstuff according to claim 39 wherein the auxiliary material is present in an amount of from 0.1 to 1.0 wt. % based on the composition.

42. The foodstuff according to claim 41 wherein the auxiliary material is present in an amount of from 0.25 to 0.75 wt. % based on the composition.

43. The foodstuff according to claim 41 wherein the auxiliary material is present in an amount of from 0.4 to 0.6 wt. % based on the composition.

44. The foodstuff according to claim 41 wherein the auxiliary material is present in an amount of approximately 0.5 wt. % based on the composition.

45. The foodstuff according to claim 1 wherein the foodstuff is selected from confectionery including sugar confectionery, chocolate, candy such as liquorice and water jellies, chewing gum, nuts; dairy products including cheese, whipped desserts, and ice cream; bakery products, either frozen or fresh and including bread, pizza, biscuits, crackers, cakes, pies; meat products including sausages, fish, ham, pork and beef, such as joints of pork or beef fresh and dried fruit; and snacks.

46. A process for preparing a foodstuff, comprising coating a foodmaterial with a barrier composition as defined in claim 1.

47. A multi-component foodstuff consisting essentially of:
(a) a first food material;
(b) a barrier composition; and
(c) a second food material wherein the first food material is coated with the barrier composition such that the barrier composition prevents or reduces movement of water from one food material to the other food material;
wherein the first food material and the second food material are different food materials having different water contents, wherein the first food material, barrier composition and the second food material are edible and the barrier composition is present in the foodstuff in such a way that its organoleptic properties of taste, after taste and mouthfeel are imperceptible, whereby a consumer of the foodstuff is not aware of the barrier composition when the foodstuff is consumed; and
wherein the barrier composition comprises
i) a wax in an amount of 2 to 50 wt. % based on the composition
ii) a compound in an amount of 50 to 98 wt. % based on the composition, having the formula

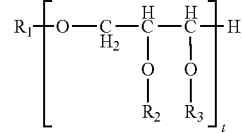

wherein t is an integer
wherein each $R_1$, $R_2$ and $R_3$ is independently selected from an acyl group or a hydrogen atom,
wherein at least one of $R_1$, $R_2$ and $R_3$ is H or an acyl group having from 2 to 6 carbon atoms (short acyl group)
wherein at least one of $R_1$, $R_2$ and $R_3$ is an optionally branched chain acyl group consisting of a saturated chain having 10 to 20 carbon atoms and an optional hydrophilic branch group (long acyl group).

* * * * *